United States Patent
Brazier et al.

[19]

[11] Patent Number: 5,813,507
[45] Date of Patent: Sep. 29, 1998

[54] DIAPHRAGM CLUTCH COVER WITH STOP LUGS CAPABLE OF DISTINGUISHING BETWEEN DIFFERENT COVER TYPES

[75] Inventors: Claude Brazier; Raymond Hagnere, both of Aimens, France

[73] Assignee: Valeo, Paris, France

[21] Appl. No.: 617,863

[22] PCT Filed: Jul. 11, 1995

[86] PCT No.: PCT/FR95/00926

§ 371 Date: May 20, 1996

§ 102(e) Date: May 20, 1996

[87] PCT Pub. No.: WO96/03589

PCT Pub. Date: Feb. 8, 1996

[30] Foreign Application Priority Data

Jul. 27, 1994 [FR] France .................................. 94 09397

[51] Int. Cl.[6] .................................................. F16D 13/58
[52] U.S. Cl. .................................... 192/89.23; 192/30 W
[58] Field of Search ........................... 192/89.23, 70.18, 192/70.27, 109 R, 30 W

[56] References Cited

U.S. PATENT DOCUMENTS

| | | | |
|---|---|---|---|
| 4,558,771 | 12/1985 | Despres | 192/70.18 |
| 4,613,025 | 9/1986 | Despres | 192/89.23 X |
| 4,751,991 | 6/1988 | Naudin | 192/89.23 |
| 5,301,782 | 4/1994 | De Briel et al. | 192/89.23 |
| 5,321,878 | 6/1994 | Schierling et al. | 192/70.27 X |

FOREIGN PATENT DOCUMENTS

| | | | |
|---|---|---|---|
| 0535702 | 4/1993 | European Pat. Off. | |
| 2242892 | 3/1975 | France . | |
| 2 564 545 | 11/1985 | France | 192/89.23 |
| 2585424 | 1/1987 | France . | |
| 28 43 272 | 4/1980 | Germany | 192/89.23 |
| 28 43 317 | 4/1980 | Germany | 192/89.23 |
| 3516264 | 6/1986 | Germany . | |
| 8334542 | 12/1992 | Germany . | |

Primary Examiner—Rodney H. Bonck
Attorney, Agent, or Firm—Longacre & White

[57] ABSTRACT

A cover plate for a diaphragm clutch mechanism including at its inner periphery fastening lugs (12) alternating with abutment lugs (22) having an overall transverse orientation for cooperation with the diaphragm. At least one stop lug (122) has a through notch which is particularly arranged to distinguish different cover plates having abutment lugs of different lengths.

4 Claims, 3 Drawing Sheets

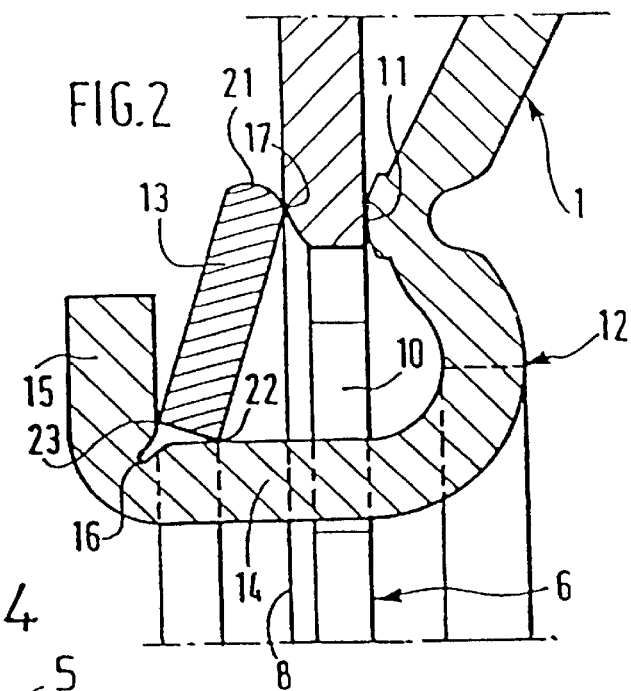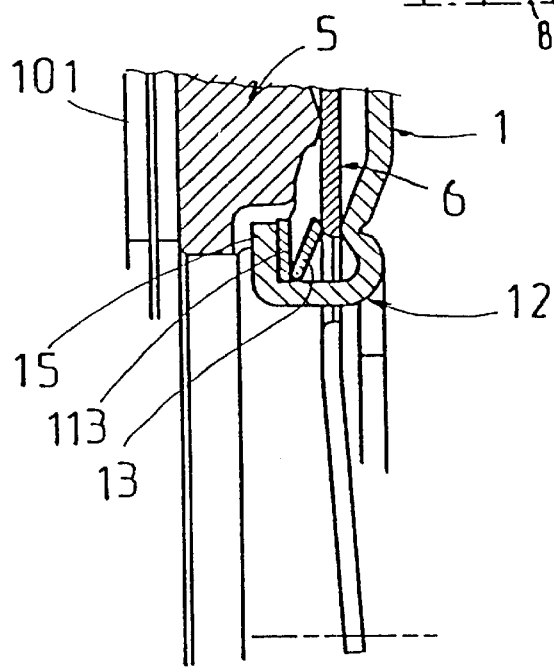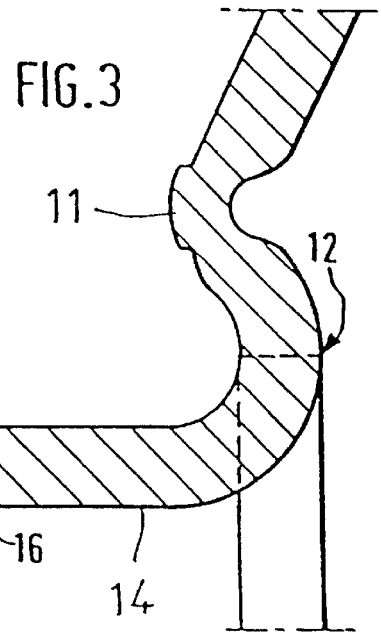

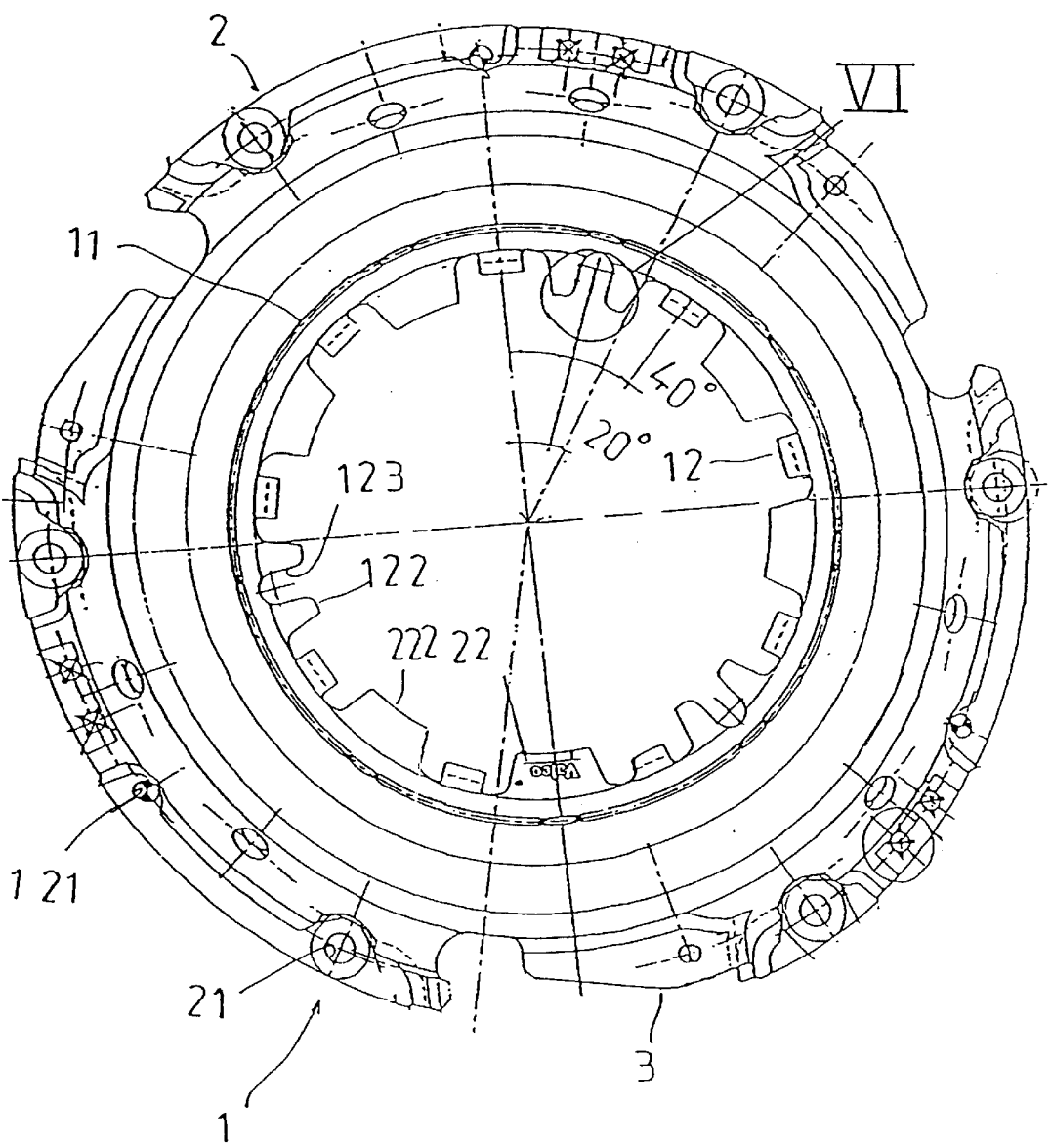

DIAPHRAGM CLUTCH COVER WITH STOP LUGS CAPABLE OF DISTINGUISHING BETWEEN DIFFERENT COVER TYPES

BACKGROUND OF THE INVENTION

1. Field of the Invention

The present invention relates to cover plates for clutch diaphragms, especially for motor vehicles, and to unitary assemblies, referred to as clutch mechanisms, which include such a cover plate, in the manner described in the documents FR-A-2 585 424, EP-A-0 535 702, and FR-A-2 242 892.

2. Description of the Prior Art

As is known (FIGS. 1 to 4), a diaphragm clutch mechanism includes a unitary assembly of annular components, namely a cover plate 1 which is usually of metal plate, a pressure plate 5, which is usually a casting, and a metallic diaphragm 6.

The cover plate 1, which is in the form of a hollow dish, includes a base portion which is oriented transversely and formed with a central hole, and which has at its outer periphery a generally transversely oriented flange which extends radially away from the axis of the assembly.

The said flange has a first set of coplanar portions 2, through which it is adapted to be fixed on to a reaction plate indicated diagrammatically at 100 in FIG. 1, together with a second set of coplanar portions 3 which are set back axially with respect to the above mentioned portions, and by which it is attached, in a manner known per se by means of resilient tongues 4, which are oriented tangentially in this case, to the pressure plate 5, which is thus coupled to the cover plate for rotation with the cover plate but with freedom to move axially with respect to it.

In the present case, the portions 2 have holes 120, 121 through which there pass, respectively, fastening members and centring pins carried by the reaction plate 100.

Similarly, the portions 3 are formed with holes for fastening the tongues 4, which are fixed by means of fastening members at one of their ends to radial lugs of the plate 5, being fixed at their other end to the portions 3 through the said holes.

The diaphragm 6 comprises a peripheral portion in the form of a Belleville ring 7, together with a central portion which is divided into radial fingers 8 by slots 9, which extend from widened passages 10 formed between the fingers 8 at the level of the root zone of the fingers 8 to the Belleville ring 7. The diaphragm 6 has a frusto-conical form in the free state, and in this case it is of metal.

The outer periphery of the Belleville ring 7 acts on a divided projecting element (which is not given a reference numeral in FIG. 1) of the pressure plate 5, while the inner periphery of the said Belleville ring 7 bears on a primary abutment 11 carried by the base portion of the cover plate 1 and, in the present case, being in the form of a projecting element 11 which is press formed in the cover plate.

In a modified version, and as described in the document FR-A-2 242 892, this primary abutment may be defined by a thrust ring which is carried by the cover plate.

The clutch is normally in the engaged position, and the diaphragm 6 bears on the abutment 11 so as to act on the said projecting element of the pressure plate 5, in order to grip the friction liners of a clutch friction wheel 101 (indicated diagrammatically in FIG. 1) between the pressure and reaction plates.

In a motor vehicle, the reaction plate 100, which may be divided into two parts so as to constitute a damped flywheel, is adapted to be fixed on the crankshaft of the engine of the motor vehicle, while the clutch friction wheel is mounted on the input shaft of the gearbox for rotation with the latter.

In order to disengage the clutch, it is necessary to exert a thrust, in the direction of the arrow A in FIG. 1, on the ends of the fingers 8 with the aid of a clutch release bearing (not shown), so as to cause the diaphragm 6 to be deflected and thereby to cease to act on the pressure plate 5.

The tongues 4 then bias the plate 5 towards the base portion of the cover plate.

In this connection, the diaphragm 6 is mounted pivotally on the cover plate 1 by assembly means which apply the diaphragm pivotally to the cover plate.

In FIG. 1 these means comprise the primary abutment 11 mentioned above, retaining members 12 which are relatively thin and flat, and a frusto-conical crown 13.

In this example, these retaining members 12 project integrally from the base portion of the cover plate, which is of press-formed metal plate, and are formed by stamping and bending.

These members 12 accordingly consist of fastening lugs with an axial portion 14 which extends through the above mentioned passages 10, together with a radial terminal wing portion 15 which is bent radially away from the axis of the assembly, along a weakening score line 16 which is formed in the axial portion 14, so as to define a bend for locating and mounting the crown 13 between the diaphragm 6 and the wing portion 15.

These fastening lugs 12 project from the inner periphery of the base portion of the cover plate, and are disposed alternately with abutment lugs 22 which also extend from the inner periphery of the cover plate.

These lugs 22, which are orientated generally transversely, are adapted to cooperate with the diaphragm 6, and more precisely with the fingers 8 of the latter, so that when the clutch mechanism is no longer applied on the reaction plate 100, they limit the deflection of the diaphragm.

It is for this reason that the inclination of the fingers 8 in this position is indicated in broken lines in the lower part of FIG. 1, the diaphragm being generally flat when the clutch is engaged and the friction liners of the clutch friction wheel 101 is new.

The outer periphery of the crown 13, which is usually referred to as a crown ring, offers a secondary abutment 17 to the diaphragm, substantially in alignment with the primary abutment 11 carried by the cover plate 1.

The crown 13 has, for example, at its outer periphery a rounded edge 21 which constitutes the secondary abutment 17, while at its inner periphery it has edges 22, 23 for contact with the portion 14 and the wing portion 15 respectively.

The line of weakening 16 is typically of trapezoidal form, with two inclined surfaces 20 and a surface 19. A rounded zone joins the projecting element 11 to the axial portion 14 of the fastening lugs.

The diaphragm is in this way mounted pivotally between its abutments 17 and 11, and during disengagement of the clutch the diaphragm 16 bears on the secondary abutment 17.

In a modified version (FIG. 4), as is disclosed in the document EP-A-0 535 702, a support crown 113 is interposed axially between the radial wing portion 15 of the fastening lugs 12 and the crown 13, which in this case lies entirely radially outwardly of the axial portion 14 of the lugs 12.

In another modified version, as is shown in the above mentioned document FR-A-2 242 892, the fastening lugs 12 are able, by virtue of their radial wing portion 15, to define the secondary abutment for direct engagement by the diaphragm. In a further modification, a thrust ring may be interposed between the said diaphragm and the bent back wing portion of the lugs.

In every case, the cover plate is subjected to a pressing operation followed by forming to shape, and finally a drawing operation so that, as can be seen in FIG. 3, it has, before fitting of the diaphragm 6, a straight terminal wing portion 15 which is parallel to the axis of the assembly and which is aligned with the axial portion 14.

The diaphragm 6 and the crown ring 13 are then fitted over the lugs 12, which have not been bent back, and then finally the said wing portions 15 are bent back radially.

Where the assembly means include a support crown 113, it is also necessary to engage the latter and in the case where one or more thrust rings are provided, it is of course also necessary to fit these latter.

At the end of a bending operation, and with reference to FIGS. 1 and 4, a precompression is applied to the crown 13, which typically exerts a load greater than that which is exerted on the diaphragm by the clutch release bearing, with the said diaphragm 6 being thus in constant engagement on the first abutment and being held elastically.

A problem then arises with these types of cover plate having fastening lugs. In this connection, prior to the final operation of bending the lugs, it is essential not to take the wrong cover plate.

For example, cover plates must not be taken which are intended for fitting of both a crown ring and a support crown if only a crown ring is to be fitted, and vice versa, because the clutch mechanism would not work correctly, and might even not work at all.

This fact is not clearly evident, because the cover plates have the same configuration, and differ from each other only in regard to the axial length of their fastening lugs.

Having regard to the thickness of the support crown, or that of a thrust ring, the difference in length is not very great as compared with that of fastening lugs which only support a crown ring.

It is of course possible to engrave the cover plates in different ways so that they can be recognised, but there is still a risk of error.

An object of the present invention is to overcome these drawbacks in a simple and inexpensive way.

SUMMARY OF THE INVENTION

In accordance with the invention, a cover plate of the type defined above, comprising, at its inner periphery, fastening lugs which are disposed alternately with abutment lugs, is characterised in that it includes at least one abutment lug which is formed with a through notch.

Thus, because of the said notch, it is possible to identify the correct cover plate, for example with the aid of an optical detector or a mechanical detector. For example, cover plates having long fastening lugs for the fitting of both a crown ring and a support crown may have a notched abutment lug, while those cover plates having short fastening lugs for fitting of either a crown ring or a simple thrust ring may be made without the notch in their abutment lug. It is thus easily possible to distinguish them from each other, by means of an optical, mechanical or other detector.

For example, with the correct cover plate a light cell may be illuminated through the slot, or a rod can be passed through the latter. In this way risks of error are eliminated.

A series of notched abutment lugs may be provided, these being preferably arranged in a regular manner. For example, cover plates having long fastening lugs may have a first series of notched abutment lugs, while those cover plates having short fastening lugs may have a second series of notched abutment lugs which are offset circumferentially with respect to the lugs of the said first series.

The cover plates can thus be mounted on jigs equipped with rods which are designed to penetrate into the notches, in such a way that only the correct cover plates are able to be mounted on the said jigs.

In accordance with the invention, a clutch mechanism is characterised in that it includes a cover plate according to the invention.

The following description illustrates the invention with reference to the attached drawings, in which:

BRIEF DESCRIPTION OF THE DRAWINGS

FIG. 2 is a view on an enlarged scale of a detail of FIG. 1 corresponding to the box 11 in the said FIG. 1;

FIG. 3 is a partial view in axial cross section of a fastening lug before its end portion has been bent;

FIG. 4 is a view similar to FIG. 3 for another embodiment;

FIG. 5 is a view in elevation of a cover plate according to the invention;

FIG. 6 is a view on an enlarged scale of a detail of FIG. 1 corresponding to the box VI in the said FIG. 5.

FIG. 4 shows a clutch cover plate 1 in accordance with the invention, which is designed to form part of the clutch mechanism of FIG. 1.

DETAILED DESCRIPTION OF THE PREFERRED EMBODIMENT

Figure 1:
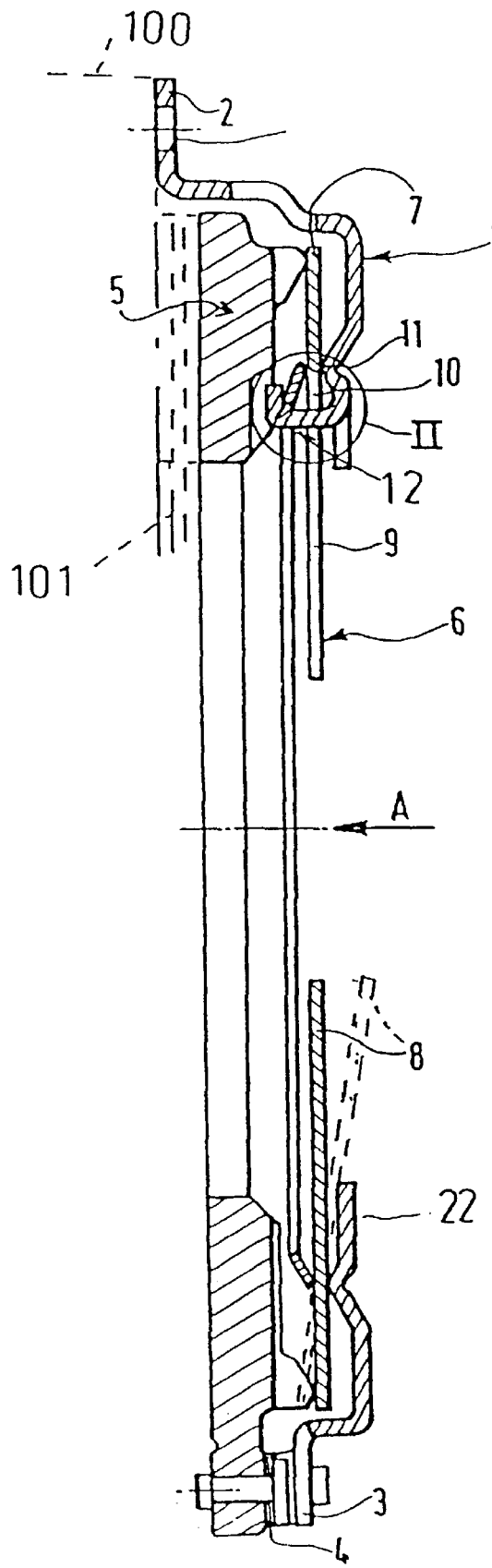
FIG. 1 is a view in axial cross section of a clutch mechanism of the prior art.

The cover plate 1 accordingly has, before being bent and prior to final assembly, a terminal wing portion which is an extension of the axial portion of the fastening lugs 12, as can be seen in FIG. 3.

This metallic cover plate, which in this example is press-formed from metal plate, is provided, in the manner described above, at its inner periphery, with integral fastening lugs 12, arranged to extend axially through the diaphragm and disposed alternately with integral abutment lugs 22, which are oriented generally radially and which are adapted to make contact with the diaphragm so as to limit the deflection of the latter.

The abutment lugs 22 are wider in the circumferential direction than the fastening lugs 12.

In this example, the fastening lugs 12, like the abutment lugs 22, are spaced apart at regular intervals of 40 degrees from each other, and there is an angle of 20 degrees between any one fastening lug 12 and an adjacent abutment lug 22.

The cover plate therefore has nine fastening lugs and nine abutment lugs spaced apart at regular intervals.

The cover plate 1 thus also has at its outer periphery coplanar fastening portions 2 and coplanar portions 3 for fastening the tangential tongues of FIG. 1.

Having regard to the foregoing, in accordance with the invention the cover plate for a clutch of the type described above is characterised in that at least one of its abutment lugs 22 is provided with a through notch.

In this example the cover plate has a series of notched abutment lugs 122 which are spaced apart regularly at 120 degrees from each other on a circle.

These abutment lugs 122 have notches 123 which are generally U-shaped. The notches are formed centrally in the lugs 122.

In this example, the three said notches 123 have a semicircular base for passage of a circular rod 200 through them, and are open towards the axis of the assembly so that they can easily be fitted over the rods 200, the 120 degree spacing of the notches facilitating positioning the cover plate.

It will be noted that there is a short distance between the base of the notch and the projecting element 11 that defines the primary deflection abutment.

Thus, during final assembly, the cover plate is oriented, for example with the aid of the through holes 21 or 121 of the said portions 2, or with the aid of the through holes in the portions 3, in such a way that if the lugs 122 are not the right ones, no rod is able to pass through the notches 123.

By contrast, for cover plates having fastening lugs of sufficient length, the rods are able to pass through.

In a modified version, optical detectors may be used.

It will also be appreciated that an operator is able more easily to mark the cover plates, and that the notches 123 do not involve any significant modification of the manufacturing tooling.

As will have been understood, with reference to the cover plate of FIG. 5, it is possible to form notches in the lugs 222 for types of cover plate having fastening lugs of different lengths.

Thus, different cover plates may have sets of abutment lugs which are notched and disposed in accordance with the length of the fastening lugs.

The notches are thus positioned according to the type of cover plate, with the sets of notches being alternated from one cover plate to the other.

The present invention is of course not limited to the embodiment described.

Thus the notches may have another form. For example they may be more shallow. In a modification, the notches may consist of closed holes. They may not be identical to each other.

It will also be noted that it is possible to identify the clutch mechanisms more easily once bending of the fastening lugs has been carried out.

In every case, projecting fastening lugs formed integrally by stamping and bending of the cover plate are of course provided, and simple thrust rings, a crown ring and a support ring can be associated with the said lugs in the manner described above.

We claim:

1. A cover plate for a diaphragm clutch mechanism, said cover plate having a central hole circumscribed by an inner periphery, said cover plate comprising: fastening lugs (12) for a diaphragm, which are disposed at said inner periphery of said cover plate and alternately with abutment lugs (22) adapted to cooperate with the diaphragm, wherein a set of said abutment lugs (122) are formed with a through notch each adapted to accommodate a rod passing therethrough and being spaced apart at regular intervals on a circle, said notches being disposed in a particular arrangement corresponding to a particular length of said fastening lugs.

2. A cover plate according to claim 1, wherein a base of the notch (123) is semicircular.

3. A clutch mechanism of the kind comprising a cover plate (1), a diaphragm (6) mounted for pivoting movement on the cover plate with the aid of fastening lugs (12) which project integrally from the cover plate (1), a pressure plate (5) which is subjected to the action of the diaphragm (6), and which is coupled by means of tangential lugs (4) to the cover plate for rotation with respect to, but with freedom to move axially with respect to, the cover plate, characterised in that it includes a cover plate according to claim 1.

4. A cover plate for a diaphragm clutch mechanism, said cover plate having a central hole circumscribed by an inner periphery, said cover plate comprising: fastening lugs (12) for a diaphragm, which are disposed at said inner periphery of said cover plate and alternately with abutment lugs (22) adapted to cooperate with the diaphragm, wherein a set of said abutment lugs (122) are each formed with a through notch each adapted to accommodate a rod passing therethrough, and said set of abutment lugs having a distinguishing means for identifying a length of said abutment lugs.

* * * * *